(12) United States Patent  
Obara

(10) Patent No.: US 6,772,365 B1
(45) Date of Patent: Aug. 3, 2004

(54) DATA BACKUP METHOD OF USING STORAGE AREA NETWORK

(75) Inventor: Kiyohiro Obara, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 688 days.

(21) Appl. No.: 09/625,198

(22) Filed: Jul. 21, 2000

(30) Foreign Application Priority Data

Sep. 7, 1999 (JP) .......................................... 11-252629

(51) Int. Cl.[7] .............................................. G06F 11/00
(52) U.S. Cl. ........................................ 714/6; 711/112
(58) Field of Search ............................. 714/6, 7, 8, 25, 714/42, 43, 44, 56, 5; 711/112, 114, 133, 159

(56) References Cited

U.S. PATENT DOCUMENTS

| | | | | |
|---|---|---|---|---|
| 5,459,853 A | * | 10/1995 | Best et al. .................. | 711/114 |
| 5,768,623 A | * | 6/1998 | Judd et al. .................. | 710/37 |
| 6,061,750 A | * | 5/2000 | Beardsley et al. ............ | 710/74 |
| 6,098,129 A | * | 8/2000 | Fukuzawa et al. ............ | 710/65 |
| 6,115,797 A | * | 9/2000 | Kanda et al. ................ | 711/147 |
| 6,393,537 B1 | * | 5/2002 | Kern et al. .................. | 711/162 |
| 6,505,273 B2 | * | 1/2003 | Taroda et al. ............... | 711/112 |
| 6,529,976 B1 | * | 3/2003 | Fukuzawa et al. ............ | 710/65 |

FOREIGN PATENT DOCUMENTS

JP          10283272     10/1998

* cited by examiner

*Primary Examiner*—Nadeem Iqbal
(74) *Attorney, Agent, or Firm*—Antonelli, Terry, Stout & Kraus, LLP

(57) ABSTRACT

A mainframe system disk control unit is provided with apparatus for accessing open system storage connected to a SAN and apparatus for converting the input and output data format to that of the open system, and the mainframe is made to access a volume of open system storage in the same manner to a volume under control of the mainframe system disk control unit. Thus, data in the open system storage is backed up to the mainframe system. Communication is performed between the program on the mainframe and the program on the open system host computer, and prior to starting backup, the updating of data in the open system storage system is prohibited.

29 Claims, 9 Drawing Sheets

Fig. 5

| Volume Number | External Reference Flag | Disk Drive Unit Number/ FC Port Number |
|---|---|---|
| 0 | 0 | 0 |
| 1 | 1 | 0 |
| 2 | 1 | 1 |
| ... | ... | ... |
| 1022 | 1 | 100 |
| 1023 | 0 | 122 |

DATA BACKUP METHOD OF USING STORAGE AREA NETWORK

BACKGROUND OF THE INVENTION

1. Field of the Invention

The present invention relates to a method of data backup for a storage system via a Storage Area Network (SAN), and is especially applicable to the comprehensive backup of data in a plurality of storage systems whose interfaces are different from each other or data which is managed by different operating systems.

2. Description of Related Art

Previously, an individual host computer was connected to each backup device such as magnetic tape storage and this host computer performed the backup of storage data. In mainframe computer systems, because the importance of backup has long been recognized, an operation and management environment for backup processing by highly functional backup utility programs or other means has been established. On the other hand, in recent years, also in open systems such as UNIX (UNIX is exclusively licensed by X/Open Company Ltd. and is a registered trademark in the U.S. and other countries) and Windows (Windows is a registered trademark of Microsoft Corp. in the U.S. and other countries), due to the increased storage capacity of storage systems, the efficient backup of data in disk storage has become an important issue. Especially, in enterprises constructing large-scale computer systems, because mainframe systems and open systems exist and are operated together, it is desirable to be able to backup both systems with the same backup device using the same backup utility program.

For open systems, the construction of storage systems that use a Storage Area Network (SAN) is currently in the spotlight. Specifically, this system uses a fiber channel (FC) in the disk interface and is configured with a plurality of host computers and fiber channel disk units connected via a fiber channel switch or hub. Here, a fiber channel disk unit is a disk unit that has a FC interface. SCSI commands can be mapped onto the fiber channel protocol. Moreover, the fiber channel disk unit can also interpret and execute the SCSI commands mapped onto that protocol, even if the interface is changed to FC. For this reason, the OS or application program running on the host computer can perform operations for the disk unit with SCSI commands that are widely used for accessing to disk units.

On the other hand, the issue of backing up data for an open system in a mainframe system is disclosed in Japanese unexamined patent gazette H10-283272, which is corresponding to U.S. application Ser. No. 09/52985. Disclosed in said gazette is a means of backing up data by connecting the disk control units of a mainframe system and open system with a communication channel, and accessing the disk control unit of the open system from the mainframe.

However, in the means disclosed in Japanese unexamined patent gazette H10-283272, since a one-to-one communication channel connects the disk control unit of the mainframe system and disk control unit of the open system, the disk control units of both the mainframe system and the open system must be provided with an interface for said communication channel separate from each interface to their hosts. Moreover, the issue of how to transfer data using this communication channel is also not disclosed in said gazette. Further, the specific method of conversion between the variable length recording method that a file system on the mainframe uses and the fixed length recording method that a file system on the host of the open system uses is also not disclosed. Also, data backup in a SAN environment is not considered by said gazette.

To accurately perform backup, cooperation with the application program must be considered. In other words, while an application is running, care must be taken when backing up or restoring data which the program refers to or updates. This is because while backup is being performed, the data that is the object of the backup may be partially modified by the application program. In this case, the backup data will become inconsistent data and it is meaningless to restore this data. This state is called the inconsistent state of backup data. In Japanese unexamined patent gazette H10-283272, a means to avoid this type of inconsistent state is not considered.

SUMMARY OF THE INVENTION

Therefore, the object of the present invention is for the OS and program running on the mainframe host to be able to access the contents of the open system storage with a method similar to the one for the storage of the mainframe system. And as such, the contents of the open system storage can be backed up on the mainframe system.

Another object of the present invention is to provide a means, while the application program is running on the open system host, to backup in a consistent state, the data referenced by that application.

The disk control unit of the mainframe system is provided with a means such as a fiber channel for accessing storage on the SAN and a means of converting the I/O data format of the storage. Thus, the mainframe system host connected to said disk control unit can be made to access the storage volume of said SAN in the same manner as a volume under the disk control unit of the mainframe system. Moreover, the I/O control processor of the mainframe system host may be equipped with a means of accessing storage on the SAN and a means of converting the I/O data format of the storage. Thus, also the mainframe can be made to access the storage volume on said SAN.

Further, by providing a means of communication between the program on the mainframe system host and the program on the open system host, consistency of the backup data is maintained.

BRIEF DESCRIPTION OF THE DRAWINGS

FIG. 5 is an example of a volume mapping table;

DESCRIPTION OF THE PREFERRED EMBODIMENTS

Preferred Embodiment 1

The first preferred embodiment of the present invention is described below.

Figure 2:
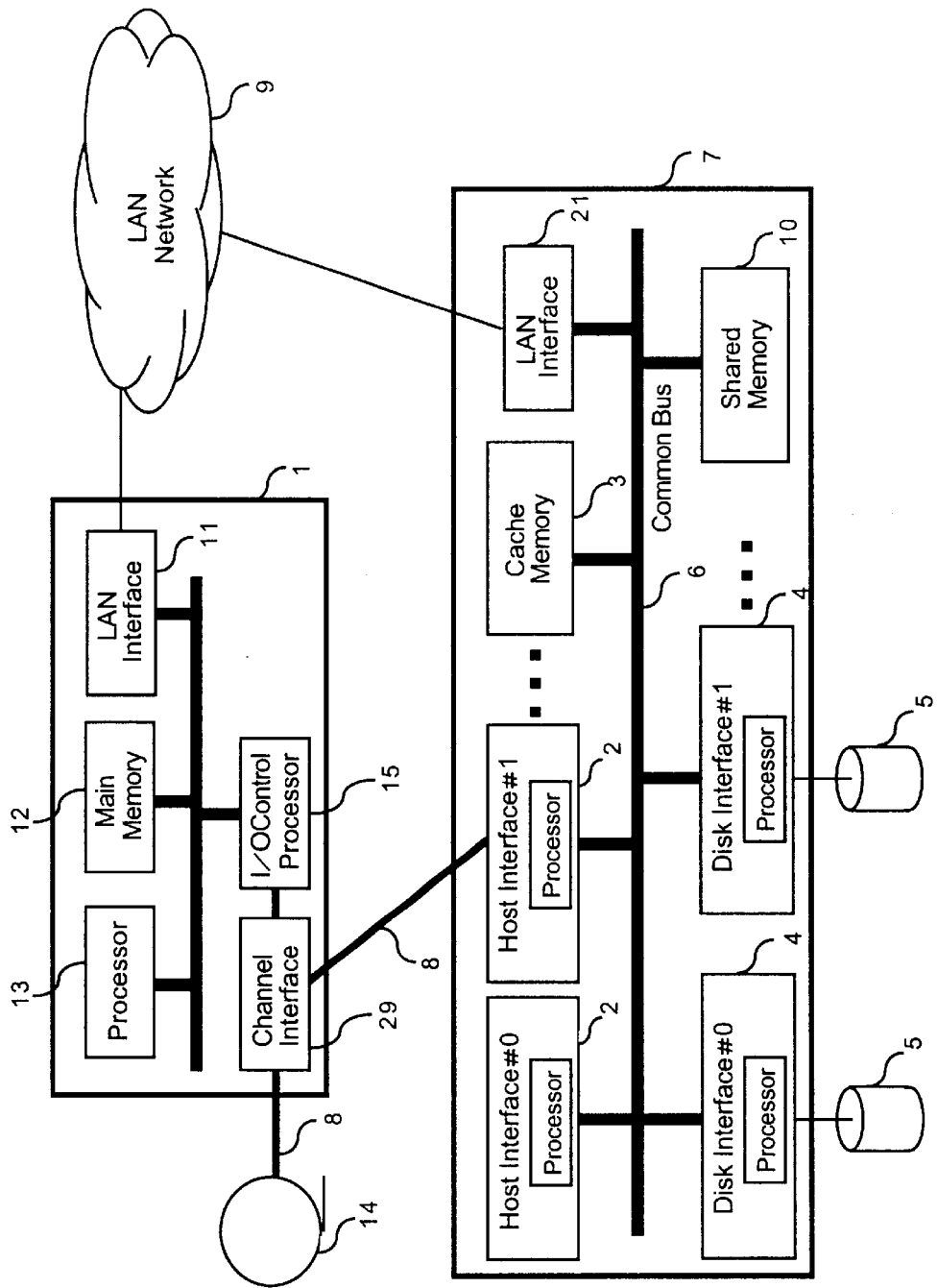
FIG. 2 is an example configuration of a computer system equipped with a disk control unit and magnetic tape storage.

FIG. 2 indicates an example configuration of a computer system equipped with a disk control unit and magnetic tape storage. Host computer 1 contains processor 13 and main memory 12 and executes an application program. The input and output between the host computer and the disk unit and magnetic tape storage 14 is performed via I/O control processor 15. After I/O control processor 15 receives an I/O command from processor 13, it operates autonomously and uses channel interface 29 to control the disk unit and magnetic tape storage 14, and performs read and write operations of the specified data. Host computer 1 contains LAN interface 11 and can transmit to and receive data from other host computers.

Disk control unit 7 is connected to host computer 1 with host interface 2 and channel path 8. Disk control unit 7 comprises cache memory 3, shared memory 10, LAN interface 21, disk interface 4 that connects to disk drive unit 5, and common bus 6 that connects them. With LAN interface 21, disk control unit 7 can communicate with host computer 1 and other devices that are connected to the LAN. Moreover, a plurality of disk interfaces or a plurality of host interfaces 2 can be installed in disk control unit 7. In the case where a plurality of host interfaces 2 is installed, the destination for all of their connections is not limited to host 1. FIG. 2 shows an example in which one host interface is connected to host 1.

Host interface 2 and disk interface 4 are equipped with a processor, and each operates autonomously. Cache memory 3 is a shared resource that can be referenced from a plurality of host interfaces 2 or a plurality of disk interfaces 4. Cache memory 3 temporarily stores the data written to this disk control unit and data that was read from disk drive unit 5 and output to the host.

If the disk control unit has the RAID function, data sent from the host is distributed to and stored in a plurality of disk drive units 5. The present preferred embodiment can also be applied to disk arrays, but in order to simplify the description, the following will describe operation for normal disks.

The operation of data input and output between host computer 1 and disk control unit 7 will be described. Here, it is assumed that the host computer's OS is a mainframe OS such as VOS3 (Virtual Operating System 3) by Hitachi Ltd., for example. I/O control processor 15 that received a write or read request from the OS generates a write or read command, and sends it to disk control unit 7 via channel path 8.

Write operations are performed in units of variable length data structures called records. This variable length record is expressed in a format called the count data key format (CKD format).

The disk to write to and the location of the record on the disk are specified by the volume number, cylinder number, head number and record number. The cylinder number and head number specify the track to write to, and the record number specifies which record to write to within the track. Read operations are also performed in the unit of the CKD format record. The disk to read and the location of the record on the disk are also specified by the volume number, cylinder number, head number and record number. The cylinder number and head number specify the track to read, and the record number specifies which record within the track will be read.

Host computer 1 and magnetic tape storage 14 are connected by channel path 8, which similarly connects host computer 1 and disk control unit 7. Data backup and restore in disk drive unit 5 is executed by backup utility software running on host computer 1. Specifically, backup is a process that, using disk control unit 7, reads the stored contents of the disk drive unit and stores them into magnetic tape storage 14. Restore is a process that reads data from magnetic tape storage 14 and writes it to disk control unit 7.

While the application program is running, care must be taken when backing up or restoring data which the program refers to or updates. This is because of the possibility that the aforementioned inconsistent state of backup data could occur.

To avoid this type of inconsistent state, the simplest method is to perform a backup after finishing the application program. However, there are cases such as the database of 24-hour operational bank, in which a 24-hour program cannot be finished. So as to be able to backup data even under these conditions, some application programs for a database management system (DBMS) have a hot backup mode. When a DBMS enters the hot backup mode, the updating of areas where data was originally stored is prohibited and update data is temporarily stored in another area. In this state, if backup is performed from a data area that was originally stored, it is not possible for the data to become inconsistent. When the hot backup mode is released, the temporarily stored data is returned to the original data storage area. For the automatic and efficient backup process, the backup utility program also performs such functions as control of the hot backup mode of the application program.

Figure 3:
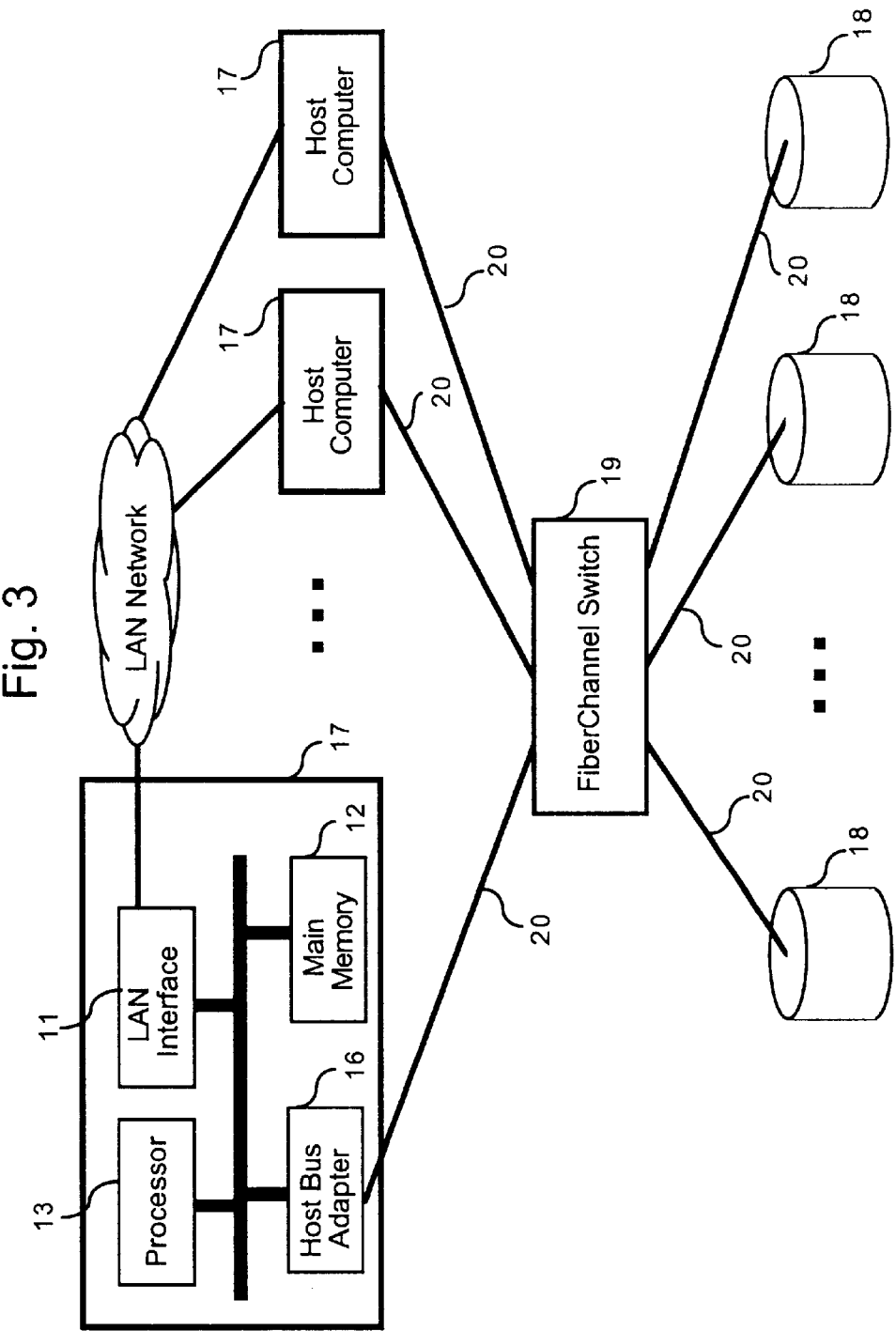
FIG. 3 is an example configuration of a computer system that uses a storage area network.

FIG. 3 shows an example configuration of a computer system that uses a SAN. The SAN is a configuration that, using fiber channel (FC) 20 in the disk interface, connects a plurality of host computers 17 and fiber channel disk units 18 with switch 19. The object of this patent can be achieved also with a disk array configuration as fiber channel disk unit 18, but in order to simplify the description here, it will be described as a simple disk unit. Host computer 17 contains processor 13 and main memory 12. Also containing LAN interface 11, it can communicate with an arbitrary host computer 17. Moreover, it has host bus adapter (HBA) 16 to interface with the fiber channel. In the present preferred embodiment, the LAN protocol and SAN communication protocol are different. SCSI commands are mapped onto the protocol of fiber channel 20. The mapping between SCSI commands and the FC is performed by HBA 16 and the device driver (not shown) that is the interface program for HBA 16. Details of the FC and SCSI standards are prescribed in the ANSI (American National Standards Institute) Standards. On the other hand, TCP/IP or other standards are used as the LAN protocol.

An arbitrary host computer 17 can access an arbitrary disk unit 18. A configuration that uses a hub is also possible, instead of switch 19. The difference between the switch and hub depends upon whether the band used by the port is independent; their logical operations are the same. The object of the present invention can be achieved also using, instead of the fiber channel and switch, a serial storage architecture, another serial interface such as a universal serial bus, and a parallel interface such as a small computer system interface (SCSI). However, here an example that uses a FC will be described.

Figure 1:
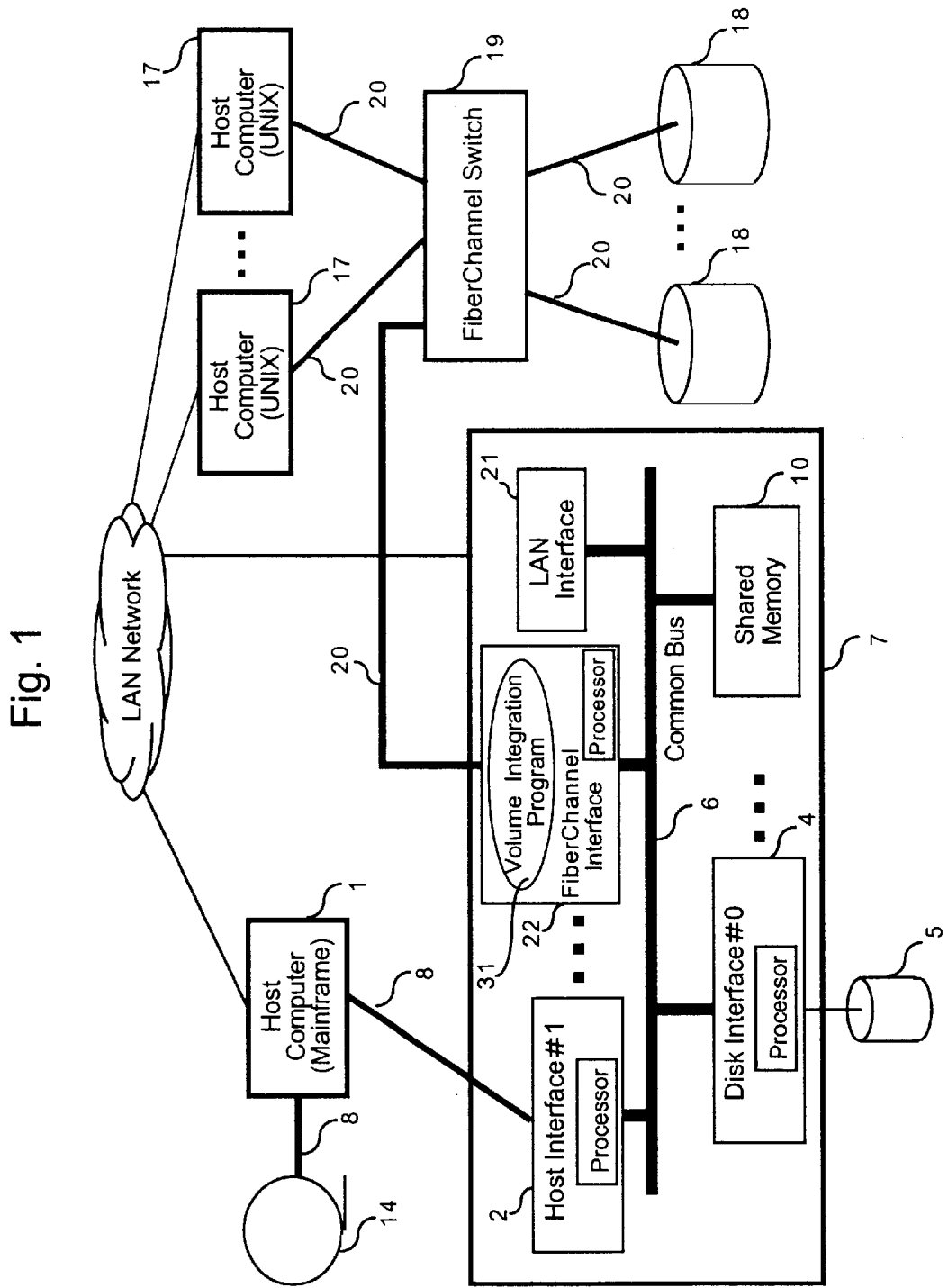
FIG. 1 is an example configuration of a computer system that backs up the contents of storage with the storage area network.

In a computer system that uses a SAN, the object of the present invention, FIG. 1 indicates an example configuration of a computer system that backs up the contents of storage. The OS of the host computer is not restricted, but here it is assumed that the OS of host computer 1 is a mainframe OS and the OS of host computer 17 is an open system OS such as UNIX.

The hardware configuration of host computer 17, fiber channel switch 19, and fiber channel disk unit 18 is the same as described with FIG. 3. The hardware configuration of host computer 1 and magnetic disk storage 14 is the same as described with FIG. 2. Disk control unit 7 is the same as described with FIG. 2 except that it is equipped with fiber channel interface 22, which is connected to the fiber channel switch by the FC.

Figure 4:
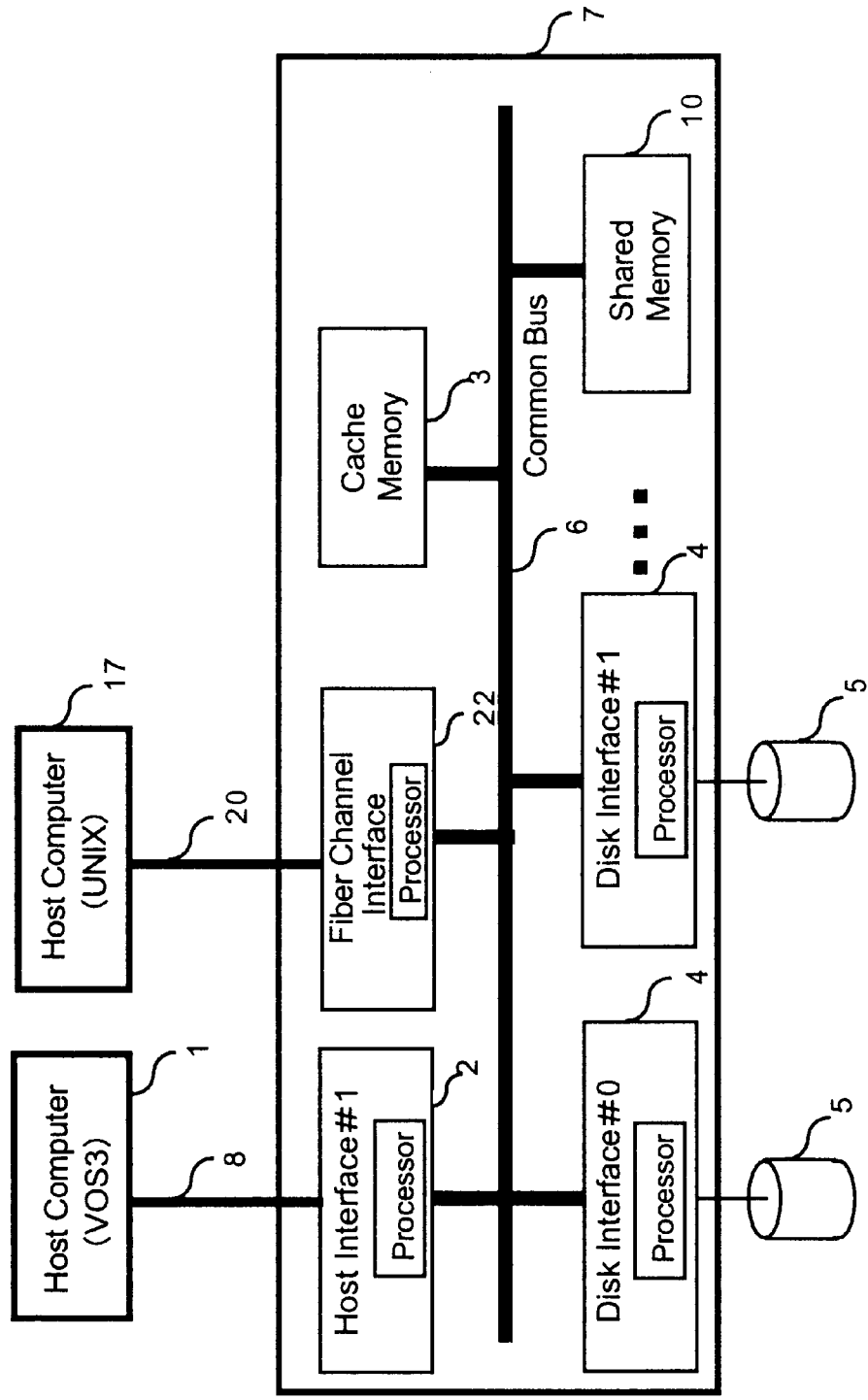
FIG. 4 is an example configuration of a disk control unit connected to hosts having different operating systems.

Fiber channel interface 22 has an internal processor, and can access an arbitrary fiber channel disk unit 18 by using its program. From the point of view of fiber channel disk unit 18, access from fiber channel interface 22 and access from host computer 17 are seen as the same. Moreover, as indicated in FIG. 4, with this fiber channel interface 22, disk control unit 7 can be used as a disk unit of the FC interface.

Next, the method of accessing fiber channel disk unit 18 from host computer 1 will be described. Here, disk control unit 7 provides a function that views fiber channel disk 18 the same as disk drive unit 5 that is under its own control, to the OS of host computer 1. In other words, fiber channel disk unit 18 is viewed from host computer 1 as one of the volumes under disk control unit 7. This function is called the volume integration function. By means of the volume integration function, the procedure for the OS to access fiber channel disk unit 18 becomes the same as the conventional procedure to access disk drive unit 5.

The volume integration function comprises a volume mapping function and a record format conversion function. Specific operation of the volume integration function will be described using data read and write operations as examples.

First, the data read operation will be described. As mentioned above, the volume number, cylinder number, head number and record number of the object to be read are specified in a read command of host computer 1. Here, by means of the volume mapping function, whether the volume of disk drive unit 5 or fiber channel disk unit 18 is to be read is determined. The volume mapping function is realized by means of the volume mapping table located in shared memory 10 in disk control unit 7.

An example configuration of the volume mapping table is shown in FIG. 5. By examining external reference flag 24 corresponding to an arbitrary volume number field 23, it is possible to judge whether the arbitrary volume is external to disk control unit 7. (Here, a value of 1 indicates the volume is external.) Similarly, by referencing disk drive unit number/port number field 25, if the volume is internal to disk control unit 7, that disk drive unit number is obtained, and if external to the disk control unit, the port number of fiber channel disk unit 18 is obtained. For example, in FIG. 1, volume number 0 is assigned to disk drive unit 0 in disk control unit 7. Moreover, volume number 1 is assigned to fiber channel disk unit 18 with port number 0 on the FC.

The volume mapping table is created and modified by commands from host computer 1. Specifically, host interface 2, using its internal processor, interprets a create or modify command for the volume mapping table and creates or modifies the volume mapping table in shared memory 10. Moreover, creation or modification of the volume mapping table can also be performed by installing a similar command interpretation function in the interface for the control console or LAN interface of disk control unit 7 via the control console or LAN interface of disk control unit 7.

With device power supply turned ON, the FC can dynamically add and remove units. Therefore, if the configuration of devices on the FC is modified, that modification must be reflected in the volume mapping table. The method to reflect this type of modification is described using FIG. 9.

The modification of a device on the FC ultimately converges on the OS of the host computer that uses that device. This is because, if the OS does not recognize the information of the device, the application program running on it will not be able to utilize that device. Using this relationship, at an arbitrary timing, agent 34 reads information related to the device on the FC from the OS, or in other words, information related to the fiber channel disk unit, and sends new information to agent 32 in host computer 1 if the device configuration has been modified. Based on the information it receives, agent 32 in host computer 1 will issue a modify command for the volume mapping table and update the volume mapping table.

These agent functions are realized as independent programs running on the host. Moreover, they may be embedded as some functions in a program such as the backup utility program to be discussed later.

Some fiber channel switches 19 have functions such as a name server, management server, and directory server, for example, that manage the information or state of devices connected to itself. These standards are prescribed in ANSI FC-GS (FC Generic Services) and elsewhere. Therefore, fiber channel interface 22 can obtain configuration-related information from fiber channel switch 19 with a procedure that conforms to the aforementioned standard, using a program running on its internal processor. In addition, if the configuration has been modified, fiber channel interface 22 generates a volume mapping table modify command, and by sending that command to host interface 2, can modify the volume mapping table. A method in which fiber channel interface 22 directly overwrites the volume mapping table is also possible.

In the case that the volume to be read is a disk drive unit in disk control unit 7, with the procedure previously described using FIG. 2, data is read and returned to host computer 1. Next is described the case in which the volume to be read is fiber channel disk unit 18 on the FC.

As previously explained, read commands from host computer 1 are in a variable length record format called CKD format. On the other hand, a fixed length block is the minimum input and output unit of fiber channel disk unit 18 that is connected to an open system computer and interprets SCSI commands. This fixed length input and output format is called FBA (Fixed Block Address) format. The block size is generally 256 bytes, but arbitrary sizes are possible. This block size is specified when the volume format is initialized and cannot be changed until the next format initialization. When initialization of the volume format is performed, blocks are assigned from the head of the volume as block 0, block 1, block 2, etc. In a volume whose size is 256000000 bytes, the last block will be block 999999. Data of arbitrary length can be handled with input and output commands which specify the head block number and number of blocks to input and output.

In this manner, the expression of input and output data is different depending on the type of OS. The function that converts these differences is the record format conversion function. By means of the record format conversion function, a volume in the FBA format can be accessed with the CKD format. In other words, an FBA-formatted volume of fiber channel disk unit 18 can be accessed with a volume format which is the same as the CKD format in disk drive unit 5. The record format conversion function is realized by means of the processor of fiber channel interface 22.

There are several methods of converting between the FBA format and the CKD format. Here, the case of reading an FBA-formatted volume with the total volume capacity 2 MB and 256-byte block size with a CKD-formatted volume with number of cylinders: 2185, number of heads: 15, capacity per track: 64 KB, and total volume capacity: 2 MB, will be described.

In this case, as seen from host computer 1, the volume of fiber channel disk unit 18 appears to be a row of 256 individual records of 256-byte record length with a count length and key length of zero one track. In other words, the FBA format block size is equal to the CKD format record size.

Block 0 of the FBA format exists in cylinder 0, head 0 and record 0 of the CKD format. Block 256 of the FBA format becomes cylinder 0, head 1 and record 0 of the CKD format. Moreover, since the number of heads is 15, cylinder 0, head 14 and record 0 of the CKD format becomes block 3584 of the FBA format, and in addition, cylinder 1, head 0 and record 0 of the CKD format becomes block 3840 of the FBA format.

This conversion is expressed as a numeric formula as follows.

FBA format block number=(cylinder number×15×256)+(head number×256)+record number Here, a conversion method has been described in which 1 record of the CKD format corresponds to 1 block of the FBA format. However, the conversion is not limited to this method. For example, there is a method in which 1 record of the CKD format corresponds to a plurality of blocks of the FBA format, and in reverse, a method in which 1 block of the FBA format corresponds to a plurality of records of the CKD format. A method in which CKD tracks and cylinders correspond to (a plurality of) FBA blocks is also possible.

As explained previously, these conversions are realized by the processor of fiber channel interface 22. A read command from host computer 1 is first analyzed by host interface 2. Then, based on reference of the volume mapping table, if it is ascertained that the object volume is fiber channel disk unit 18 on the FC, this command is sent to fiber channel interface 22. By means of the record format conversion function of fiber channel interface 22, the command is converted into a read command expressed in the FBA format, and sent as a SCSI command on the fiber channel to fiber channel disk unit 18 that is connected to the destination port.

Fiber channel disk unit 18 interprets the SCSI command, reads the contents of the specified block, and sends it back to fiber channel interface 22. Fiber channel interface 22 converts the returned data into the CKD format and sends it to host interface 2. By sending that data from host interface 2 to host computer 1, one series of a read process for fiber channel disk unit 18 is completed.

The write process from host computer 1 to fiber channel disk unit 18 is performed also using the volume mapping function and record format conversion function, similar to the read process. The delivery of data between fiber channel interface 22 and host interface 2 can also be implemented by delivering data via cache memory 3.

By means of the volume integration function discussed above, it is possible to access fiber channel disk unit 18 from host computer 1. Further, to access an arbitrary file in the volume, the position and length information of that file in the volume is necessary. Specifically, in the case of an FBA format volume, this information is the first block number and the number of blocks of the (plurality of) blocks in which the object file is stored. This information is called meta-information.

Figure 9:
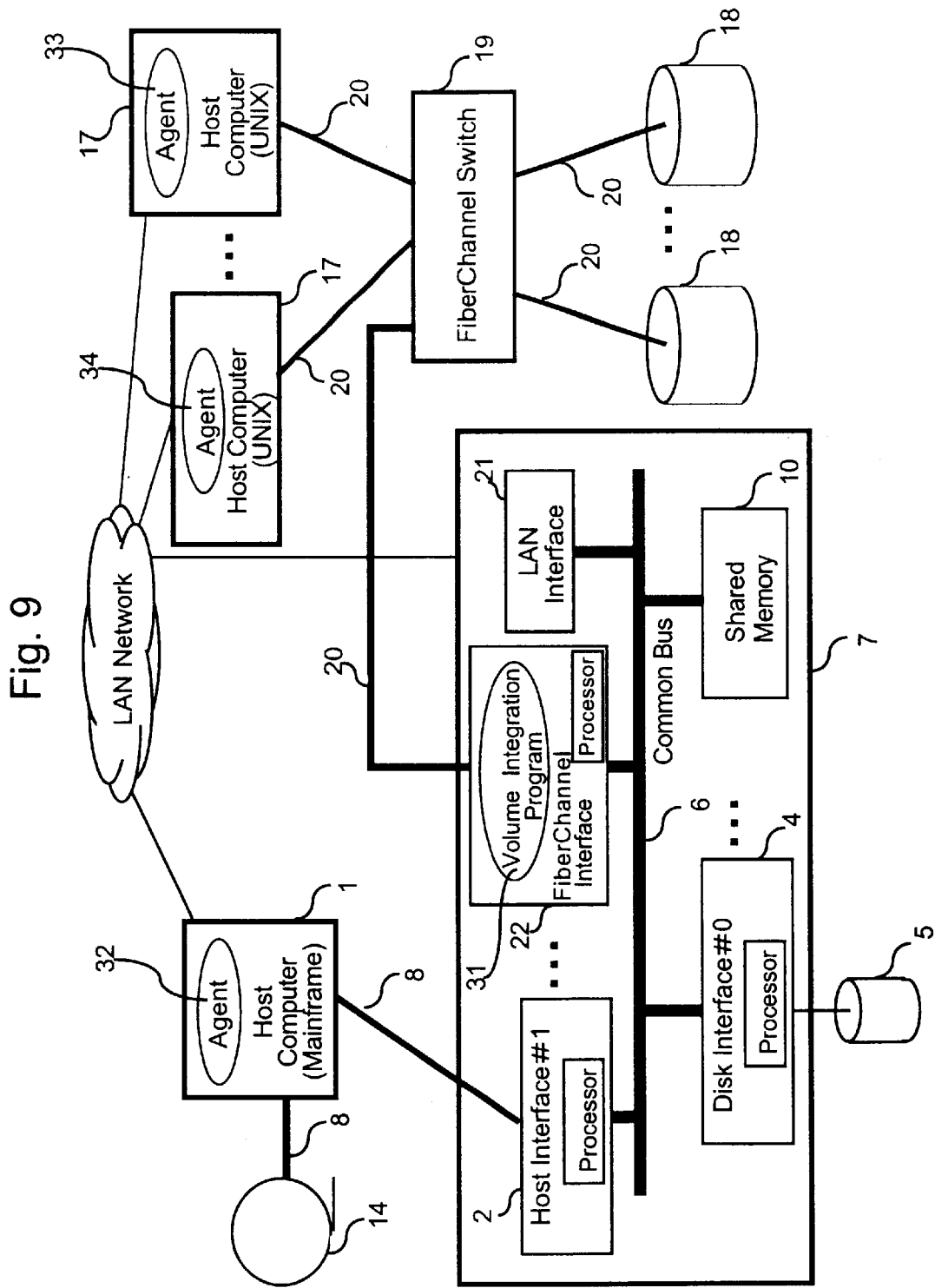
FIG. 9 is an example embodiment of the method to recognize device changes on the FC.

Meta-information is stored, in the case of a UNIX OS for example, in an area called i-node by the file system, and is collected by agent 34 which is a program running on the host shown in FIG. 9. This is because, the i-node configuration is open and the i-node area occupies the head address of the volume. Meta-information collected by agent 34 is sent to agent 32 via the LAN network or other means, and is used to compute the positions of the record and block of the access object when other programs on host 1 generate an access command.

These agent functions are realized as independent programs running on the host. Moreover, they may be embedded as some functions in a program such as the backup utility program to be discussed later.

By means of the above-mentioned method, in other words, by using the meta-information and the volume integration function, host computer 1 can access fiber channel disk unit 18 on the SAN. Therefore, as described above using FIG. 2, by means of a method similar to the backup and restore of the contents of disk drive unit 5 to magnetic tape storage 14, the backup utility program on host computer 1 can backup and restore the contents of fiber channel disk unit 18 to magnetic tape storage 14.

In the case of backing up the contents of fiber channel disk unit 18, the aforementioned inconsistent state of backup data must also be considered. In other words, while backing up the contents of fiber channel disk unit 18, host computer 17 may overwrite those contents.

Figure 7:
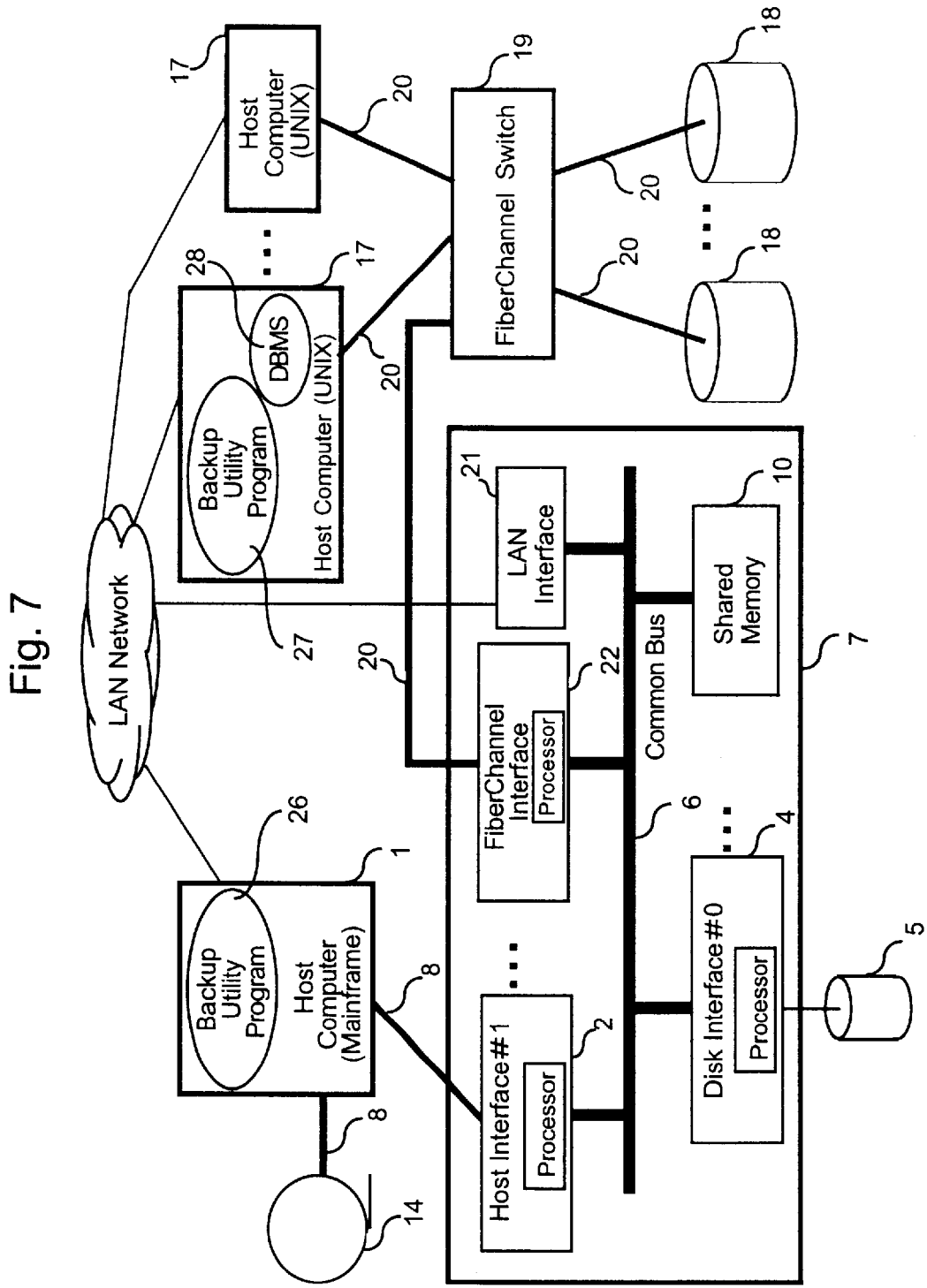
FIG. 7 is another example configuration of a computer system that backs up the contents of storage with the storage area network.
Figure 8:
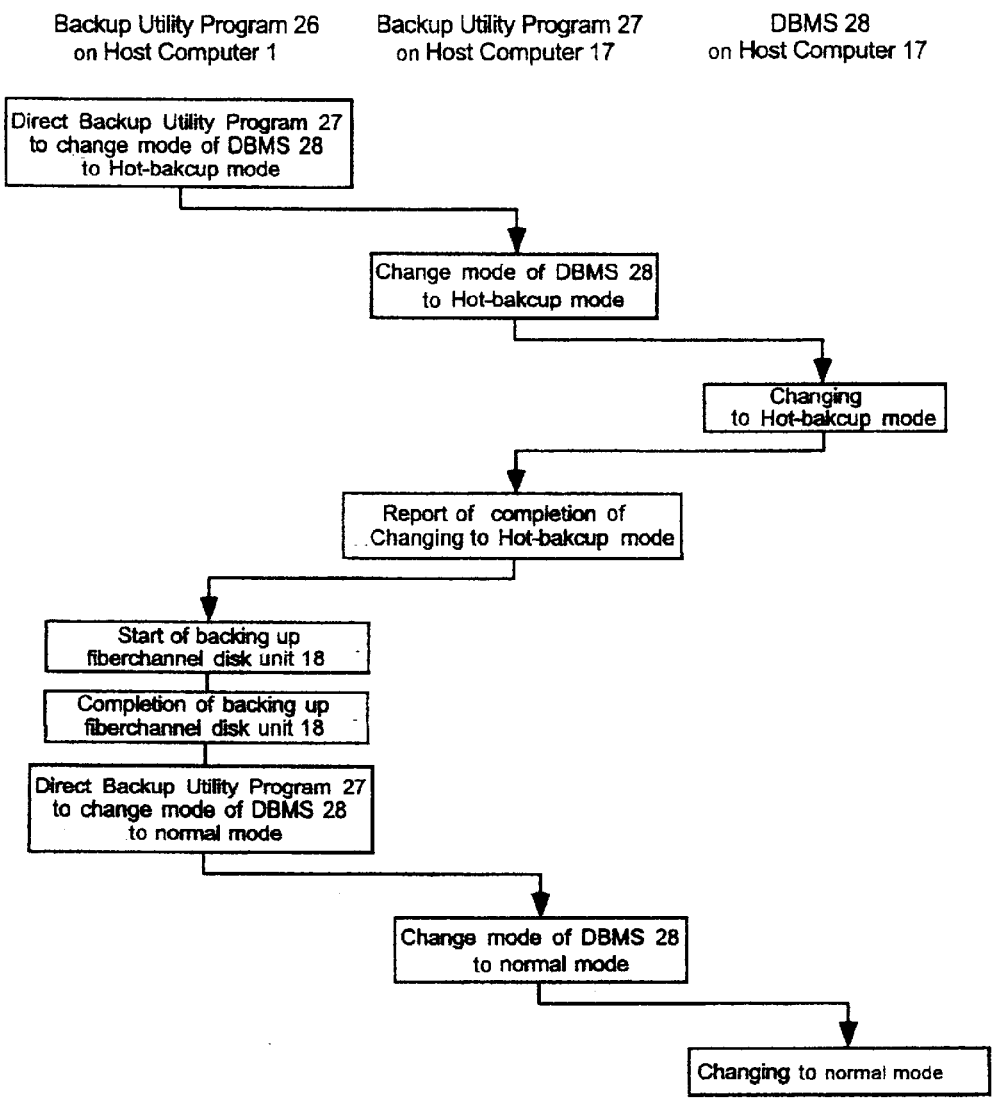
FIG. 8 is a flowchart indicating a procedure to avoid the inconsistent state of backup data.

A method to avoid this type of inconsistent state will be described next using FIG. 7. Here, it is assumed that DBMS 28 is running on host computer 17 and that this DBMS 28 has a hot backup function. In this case, backup utility program 27 runs on host computer 17, and the hot backup mode of DBMS 28 on host computer 17 is controlled with this program. Specifically, as indicated by the flowchart of FIG. 8, prior to the backup of data in fiber channel disk unit 18, backup utility program 26 on host computer 1 sends a command to change DBMS 28 to the hot backup mode to backup utility program 27 on host computer 17 via the LAN network. In other words, this is a command to prohibit DBMS 28 to update the data stored in fiber channel disk unit 18, which is the original data that is the backup object, and to temporarily store the updated data in another area. Based on this command, backup utility program 27 on host computer 17 changes DBMS 28 to the hot backup mode. When backup utility program 26 on host computer 1 receives a report from backup utility program 27 on host computer 17 that the change to hot backup mode is complete, it starts backing up the contents of fiber channel disk unit 18. When the backup operation is completed, backup utility program 26 on host computer 1 sends a command to backup utility program 27 on host computer 17, via the LAN network to release the hot backup mode of DBMS 28. By means of the above method, consistent data can be backed up.

In the case that DBMS does not support the hot backup function, it is acceptable for backup utility program 26 on host computer 1 to cause backup utility program 27 on host computer 17 to prohibit DBMS from updating data. In this case, if backup utility program 27 on host computer 17 understands that command, it reports that fact. When backup utility program 26 on host computer 1 receives that report, it starts the backup of said data. When the backing up is completed, backup utility program 26 on host computer 1 sends a command that releases the prohibition of data updating to backup utility program 27 on host computer 17.

Preferred Embodiment 2

Figure 6:
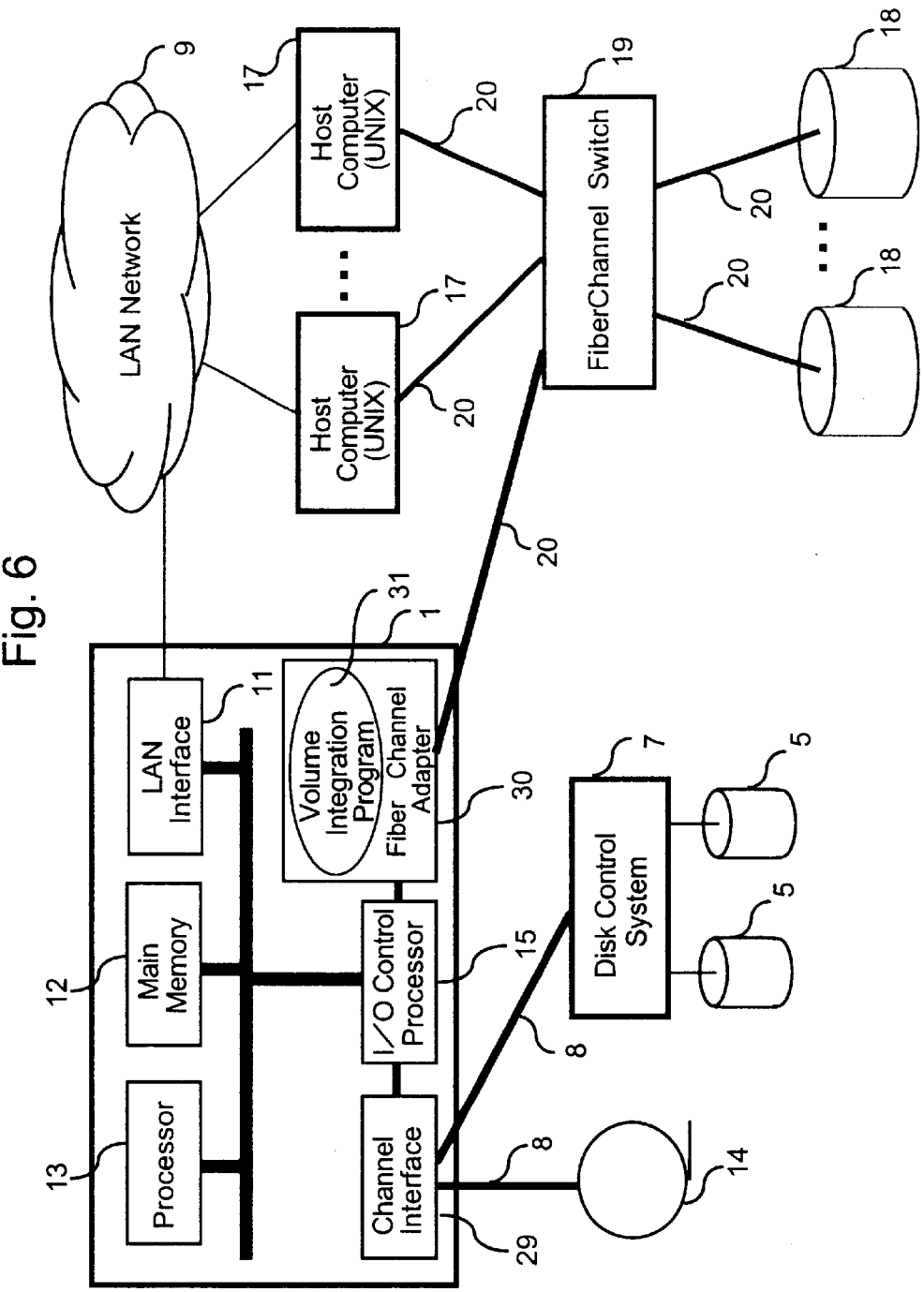
FIG. 6 is another example configuration of a computer system that backs up the contents of storage with the storage area network.

The second preferred embodiment of the present invention is described with FIG. 6 as an example.

This preferred embodiment also indicates the method with which the OS and application programs running on host computer 1 can recognize input and output in the FBA format of fiber channel disk unit 18 as those in the CKD format. By this means, the OS and application programs running on host computer 1 can backup and restore the contents of fiber channel disk unit 18.

In this preferred embodiment, I/O control processor 15 provides the volume integration function. By means of the volume integration function, the procedure for the OS and application programs to access fiber channel disk unit 18 becomes the same as the procedure to access disk control unit 7. Similar to the first preferred embodiment, the volume integration function comprises the volume mapping function and the record format conversion function. Next, the specific operation of the volume integration function will be described.

Input and output requests from the application program and backup utility program are first sent to I/O control processor 15. By means of the volume mapping function, I/O control processor 15 judges whether the volume of the access destination indicates an access to the FBA format of fiber channel disk unit 18. Similar to the first preferred embodiment, this judgement uses the volume mapping table. The volume mapping table is located in main memory that is accessible by I/O control processor 15. The configuration of the mapping table in this preferred embodiment is the same as that of the first preferred embodiment. In other words, if external reference flag field 24 is 1, the access is to fiber channel disk unit 18. If external reference flag field 24 is 0, I/O control processor 15 performs normal input and output without using the volume mapping table.

The volume mapping table is created and modified by means of a program running on host computer 1. With device power supply turned ON, the FC can dynamically add and remove units. Therefore, if the configuration of devices on the FC is modified, that modification must be reflected in the volume mapping table. The method to reflect this type of modification is omitted since it is the same as for the first preferred embodiment.

If it is ascertained that the input or output request is for the fiber channel disk unit 18 on the SAN, I/O control processor 15 executes the record format conversion function. This record format conversion function is a function that converts the CKD format and FBA format, and is equivalent to the function described in the first preferred embodiment. For that reason, a description of the specific conversion method is omitted.

Further, the collection of meta-information is the same as in the first preferred embodiment, and therefore omitted.

An FBA format input or output request is sent to fiber channel adapter 30, and processed at fiber channel disk unit 18 via the fiber channels of the FC and fiber channel switch.

The input and output results are returned to fiber channel adapter 30, and by means of I/O control processor 15, are converted to the CKD format, and are passed to the application program or backup utility program.

By means of the method described above, host computer 1 can access fiber channel disk unit 18 on the SAN. Therefore, as previously described in the first preferred embodiment using FIG. 2, by means of a method similar to backing up and restoring the contents of disk drive unit 5 to magnetic tape storage 14, the backup utility program on host computer 1 is able to backup and restore the contents of fiber channel disk unit 18 to magnetic tape unit 14.

Moreover, when backing up the contents of fiber channel disk units 18 in this case, as discussed in the first preferred embodiment, the inconsistent state of backup data must be also considered. In other words, while backing up the contents of fiber channel disk unit 18, host computer 17 may overwrite those contents.

The method to avoid this type of inconsistent state is the same as that of the first preferred embodiment.

In summarizing the above, the disclosures of this application include the following. A disk control unit connected to a first host computer, wherein the disk control unit is characterized in that said disk control unit is equipped with an interface to a switch or hub; said switch or hub connects one or a plurality of host computers and one or a plurality of disk systems; and said disk control unit accesses the storage contents of said plurality of disk systems by means of said interface and provides a means to send the contents of said access to said first host computer.

The disk control unit of (1), wherein the disk control unit is characterized in that a disk unit that is connected to the switch or hub connected to said disk control unit appears the same to the first host computer as a disk drive unit that is connected to said disk control unit, by means of performing input or output after judging, based on an internal table, whether the access destination of an input or output command from the first host computer is the disk drive unit connected to the disk control unit itself or a disk unit connected to the switch or hub connected to the disk control unit itself.

The disk control unit of (2), wherein:

in the case where the command format and data format differ for a disk drive unit connected to itself and a disk unit connected to the switch or hub connected to itself, the disk control unit characterized by the conversion of the command format and data format of the disk unit connected to the switch or hub connected to itself into the command format and data format used by the disk drive unit connected to itself.

(4) A host computer connected to tile disk control unit of (3) and to a magnetic tape storage, wherein:

a computer system characterized by reading the contents of a disk unit connected to the switch or hub that is connected to said disk control unit, and backing up those contents in the magnetic tape storage.

(5) A host computer connected to the disk control unit of (3) and to a magnetic tape storage, wherein:

a computer system characterized by restoring data by means of writing data from said magnetic tape storage to a disk unit connected to the switch or hub that is connected to said disk control unit.

(6) The computer system of (4), wherein:

prior to backup, the backup program on said first host computer communicates with the utility program on the second host computer that is using data of the disk unit that is the backup object; and, a computer system is characterized in that the utility program on said second host computer controls the program that modifies the contents of the data that is said backup object so that the data that is the backup object is not modified during the backup interval.

(7) A processor system, equipped with an interface to the switch or hub, wherein:

said switch or hub connects one or a plurality of host computers and one or a plurality of disk systems;

by means of said interface, a processor system which accesses the storage contents of said plurality of disk systems; and, a processor system is characterized in that a disk unit connected to the switch or hub connected to said processor system appears the same to the operating system or program that runs said processor system as the disk drive unit directly connected to said processor system, by means of performing input or output after judging, based on the internal table, whether the access destination of the input or output command is the disk drive unit directly connected to itself or a disk unit connected to the switch or hub connected to itself (8) The processor system of (7), wherein:

a processor system characterized by the conversion of the command format and data format of a disk unit connected to the switch or hub connected to itself into the command format and data format used by the disk drive unit connected to itself, in the case where the command format and data format differ for the disk control unit directly connected to itself and a disk unit connected to the switch or hub connected to itself.

(9) The processor system of (8), wherein:

a magnetic tape storage is connected; and a computer system characterized by reading the contents of a disk unit connected to the switch or hub that is connected to said processor system, and backing up those contents in said magnetic tape storage.

(10) The processor system of (8), wherein:

the magnetic tape storage is connected; and a computer system characterized by restoring data by means of writing data from said magnetic tape storage to a disk unit connected to the switch or hub that is connected to said processor system.

(11) The computer system of (4), wherein:

prior to backup, the backup program on said first host computer communicates with the utility program on the second host computer that is using data of the disk unit that is the backup object; and a computer system is characterized in that the utility program on said second host computer controls the program that modifies the contents of the data that is said backup object so that the data that is the backup object is not modified during the backup interval.

With the present invention, it is possible to access, via the disk control unit, the contents of storage on a storage area network (SAN) that uses fiber channels. Moreover, it is possible to access storage contents whose format differs from the input and output format used by the host computer. Therefore, it is possible to perform a composite backup of the contents of storage under control of the host computer and the contents of storage on the SAN, or the contents of storage whose format differs from the input and output format used by the host computer in the same magnetic tape storage. This means, for example, that the storage contents of an open system such as UNIX can be backed up in a magnetic tape storage controlled by a mainframe. Consequently, the backup reliability is improved and the operating cost is lowered.

What is claimed is:

1. In a computer system including a first host computer that specifies input and output data with a first data format, a second host computer that specifies input and output data with a second data format that differs from the first data format, a first storage system connected to the first host computer for storing input data specified with the first data format from the first host computer, a second storage system for storing input data specified with the second data format from the second host computer, and a backup unit which the first host computer controls to input/output data to, wherein the first storage system, the second host computer and the second storage system are connected by a network, a data backup method of backing up data in the second storage system to the back up unit comprising the steps of:

storing volume information assigned to the first storage system and the second storage system into the first storage system;

determining, by the first storage system, if a read request, formatted to have a first data format, from the first host computer specifies data in the second storage system with the volume information;

if so, converting, by the first storage system, the read request formatted to have the first data format, from the first host computer into a read request formatted to have a second data format;

reading data specified by the read request, formatted to have the first data format, from the first host computer, from the second storage system based on the converted read request formatted to have the second data format and storing the read data into the first storage system;

sending the read data from the first storage system to the first host computer;

receiving, by the first storage system, information on modification to configuration of the second storage system; and modifying, by the first storage system, the volume information based on the modification information.

2. A data backup method according to claims 1, wherein volume information is stored in a memory in the first storage system.

3. A data backup method according to claim 1, wherein the first data format is CKD format, and the second data format is FBA format.

4. A data backup method according to claim 1, wherein the first host computer and the second host computer are connected with a LAN (local area network), and wherein the modification information is sent from the second host computer via the LAN.

5. A data backup method according to claim 1, wherein the network has a fiber channel switch that manages configuration of the second network, and wherein the modification information is sent from the fiber channel switch via the second network.

6. In a computer system including a first host computer that specifies input and output data with a first data format, a second host computer that specifies input and output data with a second data format that differs from the first data format, a first storage system connected to the first host computer for storing input data specified with the first data format from the first host computer, a second storage system for storing input data specified with the second data format from the second host computer; and a backup unit which the first host computer controls to input/output data to, wherein the first host computer and the second host computer are connected by a first network, and the first storage system, the second host computer and a second storage system are connected by a second network, a data backup method performed by the first host computer of backing up data in the second storage system to the back up unit comprising the steps of:

receiving meta-information that the second host computer manages from the second host computer via the first network:

creating a command formatted to have the first data format based on the meta-information in order to specify a read file in the second storage system;

sending the command formatted to have the first data format to the first storage system; and converting, by the first storage system the command formatted to have the first data format to a command formatted to have the second data format and sending the command formatted to have the second data format to the second storage system, wherein the command formatted to have the second data format is used by said second storage system to read the specified read file in the second storage system, wherein the specified read file read from the second storage system is stored in the first storage system, and sent to the first host computer.

7. A data backup method according to claim 6, wherein the first data format is CKD format, and the second data format is FBA format.

8. In a computer system comprising a first host computer; a second host computer which is connected to the first host computer by a first network, a first storage system connected to the first host computer for storing input data from the first host computer, a second storage system for storing input data from the second host computer; a backup unit which the first host computer controls to input/output data to, wherein the first storage system, the second host computer and a second storage system are connected by a second network, a data backup method performed by the first host computer for backing up data in the second storage system to the back up unit comprising the steps of:

directing the second host computer to prohibit updating of backup object stored in the second storage system, reading the backup object via the first storage system; and sending the read backup object to the backup unit, wherein the first host computer creates a command formatted to have the first data format to specify a read file to backup as the backup object and sends the command formatted to have the first data format to the first storage system, wherein the first storage system converts the command formatted to have the first data format to a command formatted to have the second data format, wherein the command formatted to have the second data format is used by said second storage system to read the specified read file in the second storage system, wherein the specified read file read from said second storage system is stored in the first storage system, and sent to the first host computer.

9. A data backup method according to claim 8, further comprising the step of directing the second host computer to release the prohibition of updating the backup object, when backup of the backup object is complete.

10. A data backup method according to claim 8, wherein the first host computer directs said a data base management system on second host computer to change to hot backup mode.

11. A data backup method according to claim 8, wherein the first data format is CKD format, and the second data format is FBA format.

12. In a computer system comprising a first host computer, a second host computer which is connected to the first host computer by a first network, a first storage system connected to the first host computer for storing input data from the first host computer, a second storage system for storing input data from the second host computer; a backup unit which the first host computer controls to input/output data to, wherein the first storage system, the second host computer and a second storage system are connected by a second network, a data backup method performed by the first host computer for backing up data in the second storage system to the back up unit comprising the steps of:

directing the second host computer to change to a mode that stores updated data in an area separate from the area where the original data of the backup object is stored;

reading the backup object via the first storage system; and sending the read backup object to the backup unit, wherein the first host computer creates a command formatted to have the first data format to specify a read file to backup as the backup object and sends the command formatted to have the first data format to the first storage system, wherein the first storage system converts the command formatted to have the first data format to a command formatted to have the second data format, wherein the command formatted to have the second data format is used by said second storage system to read the specified read file in the second storage system, wherein the specified read file read from said second storage system is stored in the first storage system, and sent to the first host computer.

13. A data backup method according to claim 12, further comprising the step of directing the second host computer to release the change to the mode, when backup of the backup object is complete.

14. A data backup method according to claim 12, wherein the first data format is CKD format, and the second data format is FBA format.

15. In a computer system comprising a first host computer that specifies input and output data with a first data format, a second host computer that specifies input and output data with a second data format that differs from the first data format, a first storage system connected to the first host computer for storing input data specified with the first data format from the first host computer, a second storage system for storing input data specified with the second data format from the second host computer, and a backup unit which the first host computer controls to input/output data to, wherein the first host computer, the second host computer and the second storage system are connected by a network, a data backup method performed by the first host computer of backing up data in the second storage system to the back up unit comprising the steps of:

assigning volume information to the second storage system in order to access the second storage system based on modification information;

converting, by the first storage system, a read request formatted to have the first data format into a read request formatted to have the second data format if the read request formatted to have the first data format specifies volume information assigned to the second storage system and sending the converted read request formatted to have the second data format to the second storage system;

receiving, in the first storage system, data specified with the converted read request formatted to have the second data format, from the second storage system via the second network and storing the data in the first storage system; and sending, by the first storage system, the received data to the backup unit.

16. A data backup method according to claim 15, wherein the first host computer and the second host computer are connected with a LAN (local area network), the method comprising the steps of:

receiving information on modification to configuration of the second storage system via the LAN; and modifying the volume information based on the modification information.

17. A data backup method according to claim 15, wherein the network has a fiber channel switch that manages configuration of the second network, the method further comprising steps of:

receiving information on modification to configuration of said second storage system from the fiber channel switch; and modifying the volume information based on the modification information.

18. A data backup method according to claim 15, wherein the first data format is CKD format, and the second data format is FBA format.

19. In a computer system comprising a mainframe host computer that specifies input and output data with a first data format, an open system host computer that specifies input and output data with a second data format that differs from the first format a mainframe storage system connected to the mainframe host computer for storing input data specified with the first data format from the mainframe host computer, an open system storage system for storing input data specified with the second data format from the open system host computer, and a backup unit which the mainframe host computer controls to input/output data to, wherein the mainframe storage system, the open system host computer and the open system storage system are connected by a network, the mainframe storage system comprising:

a memory for storing volume information assigned to the first storage system and the open system storage system;

a host adapter connectable to the mainframe host computer, the host adapter having a first processor that creates the volume information;

a communication adapter connectable to the network, the communication adapter having a second processor that performs a program converting a read request formatted to have the first data format from the mainframe host computer into a read request formatted to have the second data format in order to read backup object to the backup unit from the open system storage system and sending the converted read request formatted to have the second data format to the open system storage system which responds by reading the backup object and sending the backup object to the mainframe storage system, wherein the first processor in the host adapter modifies the volume information based on information on modification to configuration of the open system storage system.

20. A mainframe storage system according to claim 19, wherein the host adapter determines if a first data format from the mainframe host computer specifies data in the open system storage system with the volume information.

21. A mainframe storage system according to claim 19, wherein the first data format is CKD format, and the second data format is FBA format.

22. A mainframe storage system according to claim 19, wherein the mainframe host computer and the open system host computer are connected with a LAN (local area network), and wherein the modification information is sent from the open system host computer via the LAN.

23. A mainframe storage system according to claim 19, wherein the network has a fiber channel switch that manages configuration of the second network, and wherein the modification information is sent from the fiber channel switch via the second network.

24. In a computer system comprising a mainframe host computer, an open system host computer, a mainframe storage system connected to the mainframe host computer, a open system storage system, and a backup unit which the mainframe host computer controls to input/output data to, wherein the mainframe host computer and the open system host computer are connected by a first network, and the mainframe storage system, the open system host computer and the open system storage system are connected by a second network, the mainframe host computer comprising:

a communication adapter connectable to the first network, wherein the communication adapter receives meta-information that the open system host computer manages from the open system host computer via the first network;

a channel adapter connectable to the mainframe storage system; and an input/output control processor, wherein the input/output control processor creates a command formatted to have the first data format based on the meta-information in order to specify a read file that is a backup object to be backed up to the backup unit from the open system storage system and sends the command to the mainframe storage system via the channel adapter, wherein the mainframe host computer creates a command formatted to have the first data format to specify a read file to backup as the backup object and sends the command formatted to have the first data format to the first storage system, wherein the first storage system converts the command formatted to have the first data format to a command formatted to have the second data format, wherein the command formatted to have the second data format is used by said second storage system to read the specified read file in the second storage system, wherein the specified read file read from said second storage system is stored in the first storage system, and sent to the first host computer.

25. In a computer system including a mainframe host computer that specifies input and output data with a first format, an open system host computer that specifies input and output data with a second format that differs from the first format, a mainframe storage system connected to the mainframe host computer for storing input data specified with the first format from the mainframe host computer, an open system storage system for storing input data specified with the second format from the open system host computer, and a backup unit which the mainframe host computer controls to input/output data to, wherein the mainframe host computer and the open system host computer are connected by a first network and the mainframe storage system, the open system host computer, the open system storage system are connected by a second network, the mainframe host computer comprising:

a communication adapter connectable to the second network, the communication adapter having a second processor that performs a program converting a command formatted to have the first data format from the mainframe host computer into a command formatted to have the second data format in order to read a specified backup object from the storage system; and a channel adapter connectable to the backup unit, wherein the communication adapter receives the backup object specified with the converted command formatted to have the second data format from the open system storage system via the second network, and wherein the received data is sent to the backup unit via the channel adapter.

26. A mainframe host computer according to claim 25, further comprising:

a memory for storing volume information assigned to the mainframe storage system and the open system storage system;

an input/output control processor, wherein the input/output control processor determines if data to be accessed is in the open system storage system or not with the volume information.

27. A mainframe host computer according to claim 26, wherein the mainframe host computer and the open system host computer are connected with a LAN (local area network), the mainframe host computer further comprising a LAN adapter connectable to the LAN, wherein the LAN adapter receives information on modification to configuration of the open system storage system via the LAN, and wherein the volume information stored in the memory is modified based on the modification information.

28. A mainframe host computer according to claim 26, wherein the network has a fiber channel switch that manages configuration of the second network, and wherein the communication adapter receives information on modification to configuration of said open system storage system from the fiber channel switch; and wherein the volume information stored in the memory is modified based on the modification information.

29. A mainframe host computer according to claim 25, wherein the first data format is CKD format, and the second data format is FBA format.

* * * * *